UNITED STATES PATENT OFFICE.

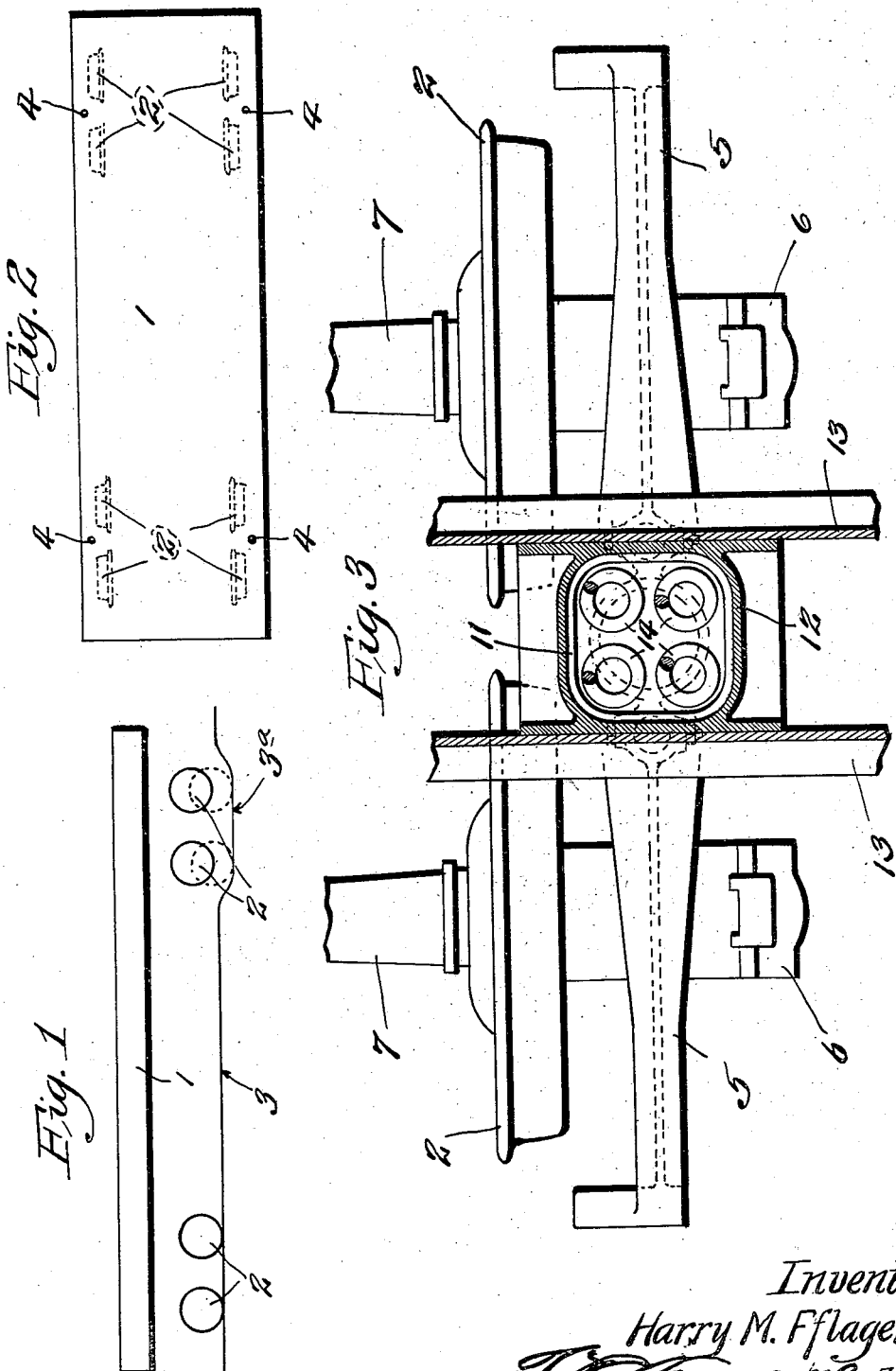

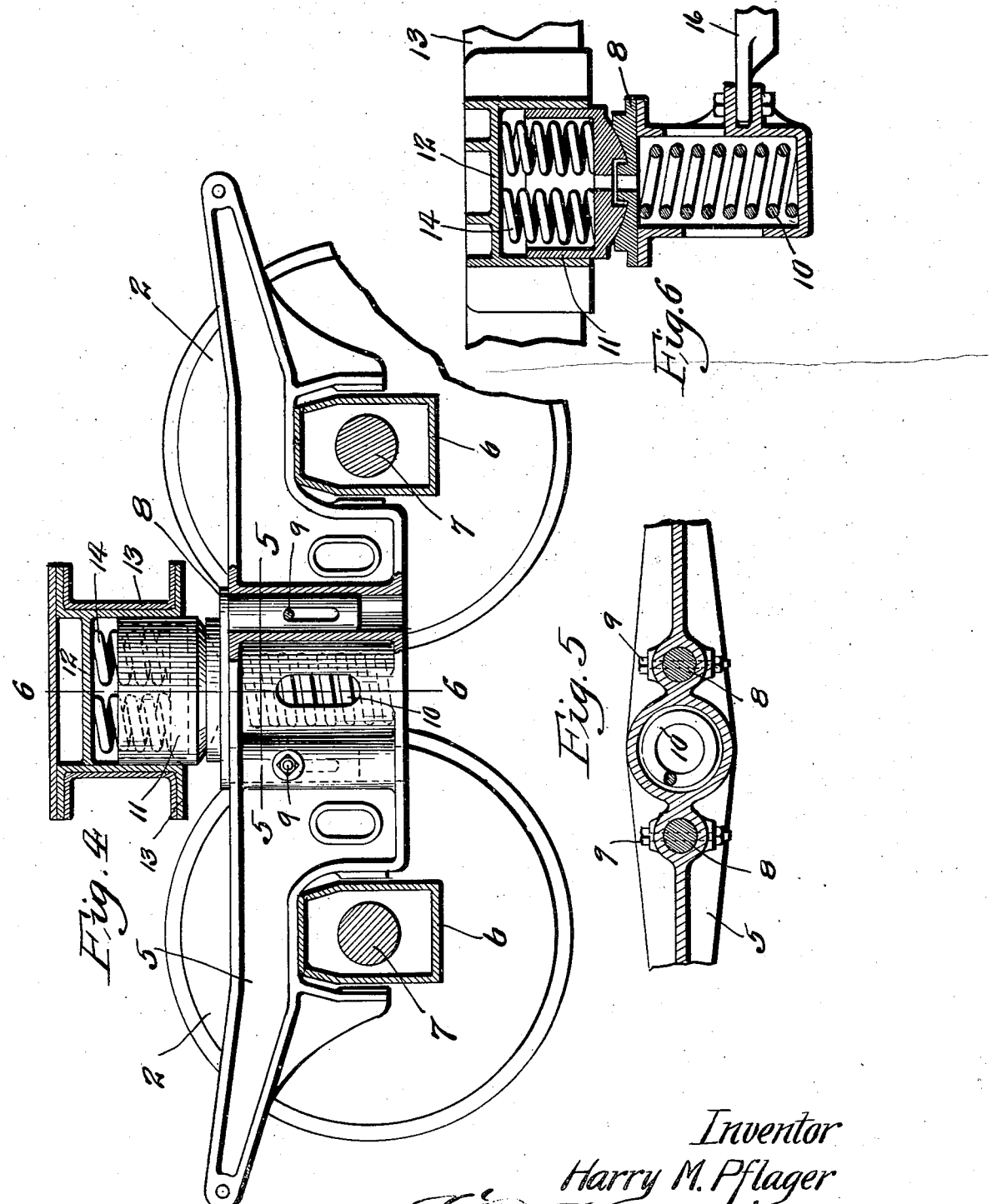

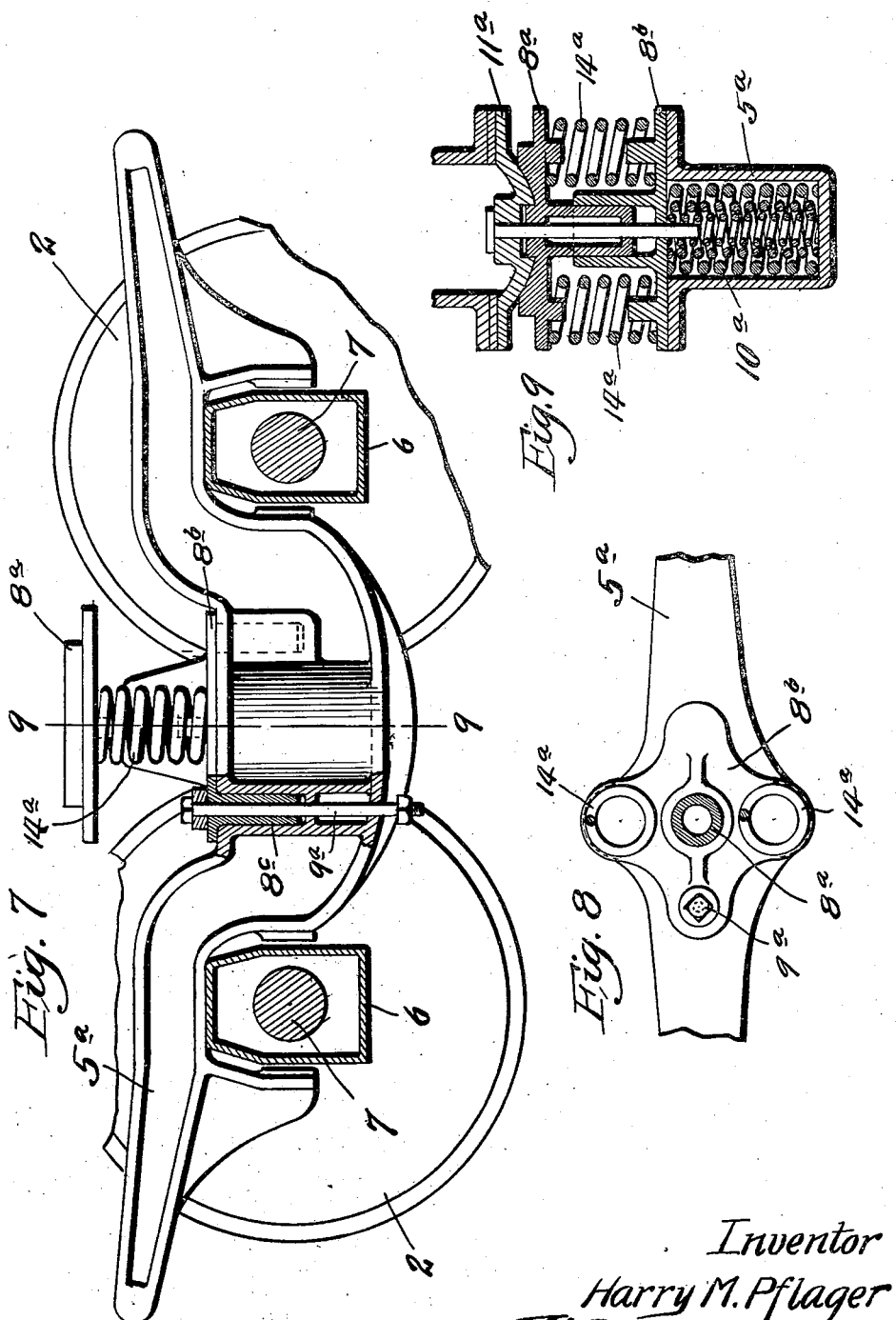

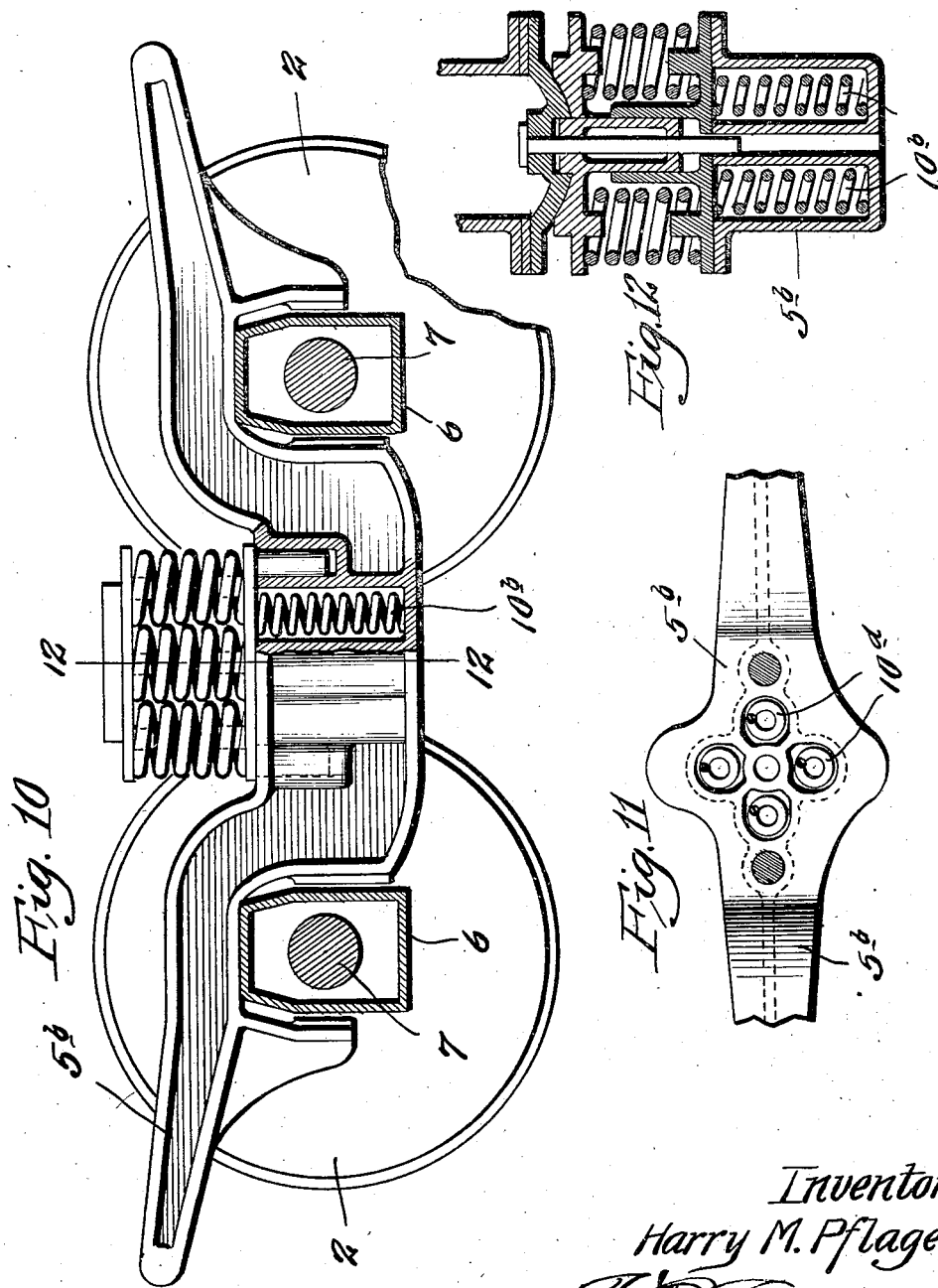

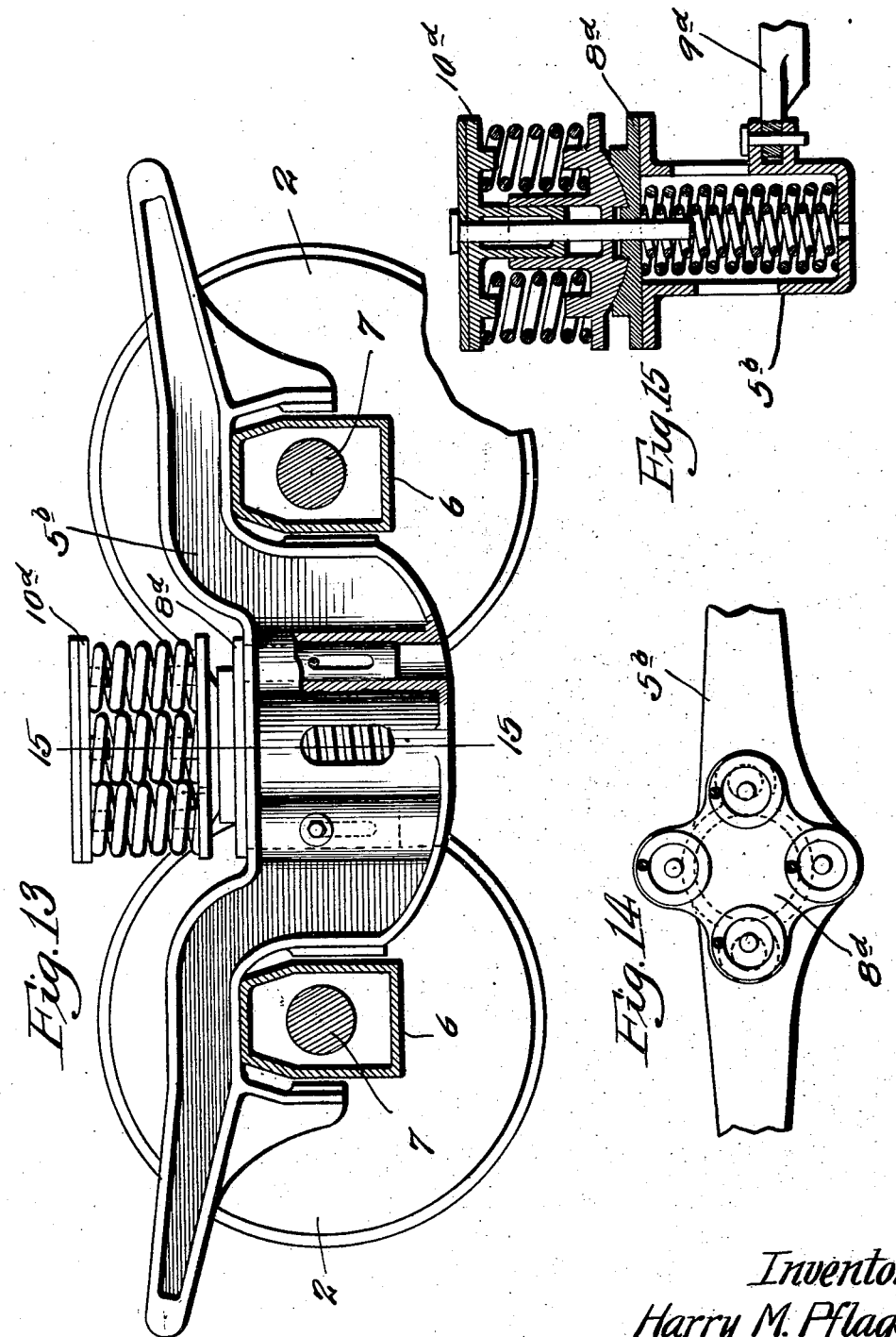

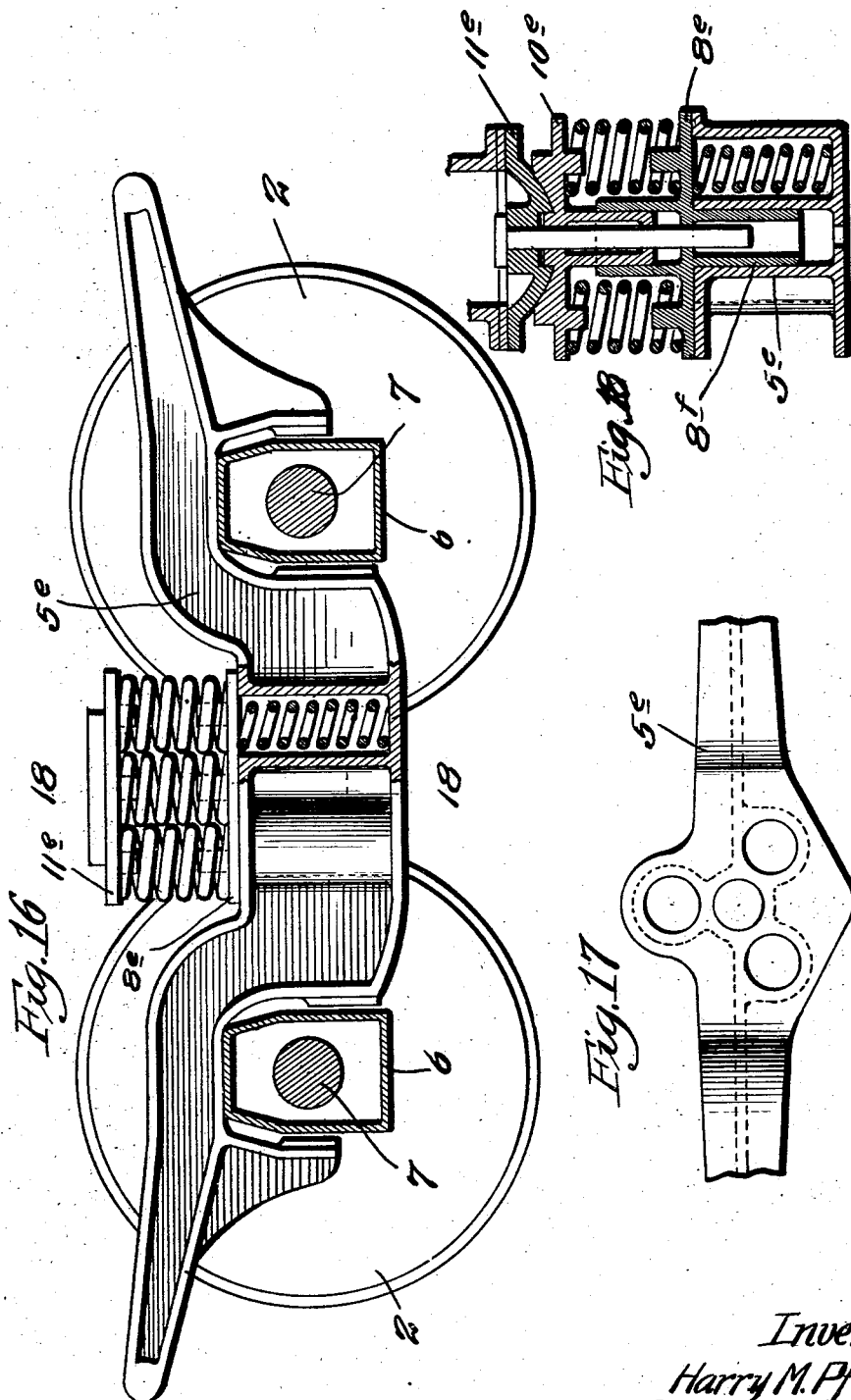

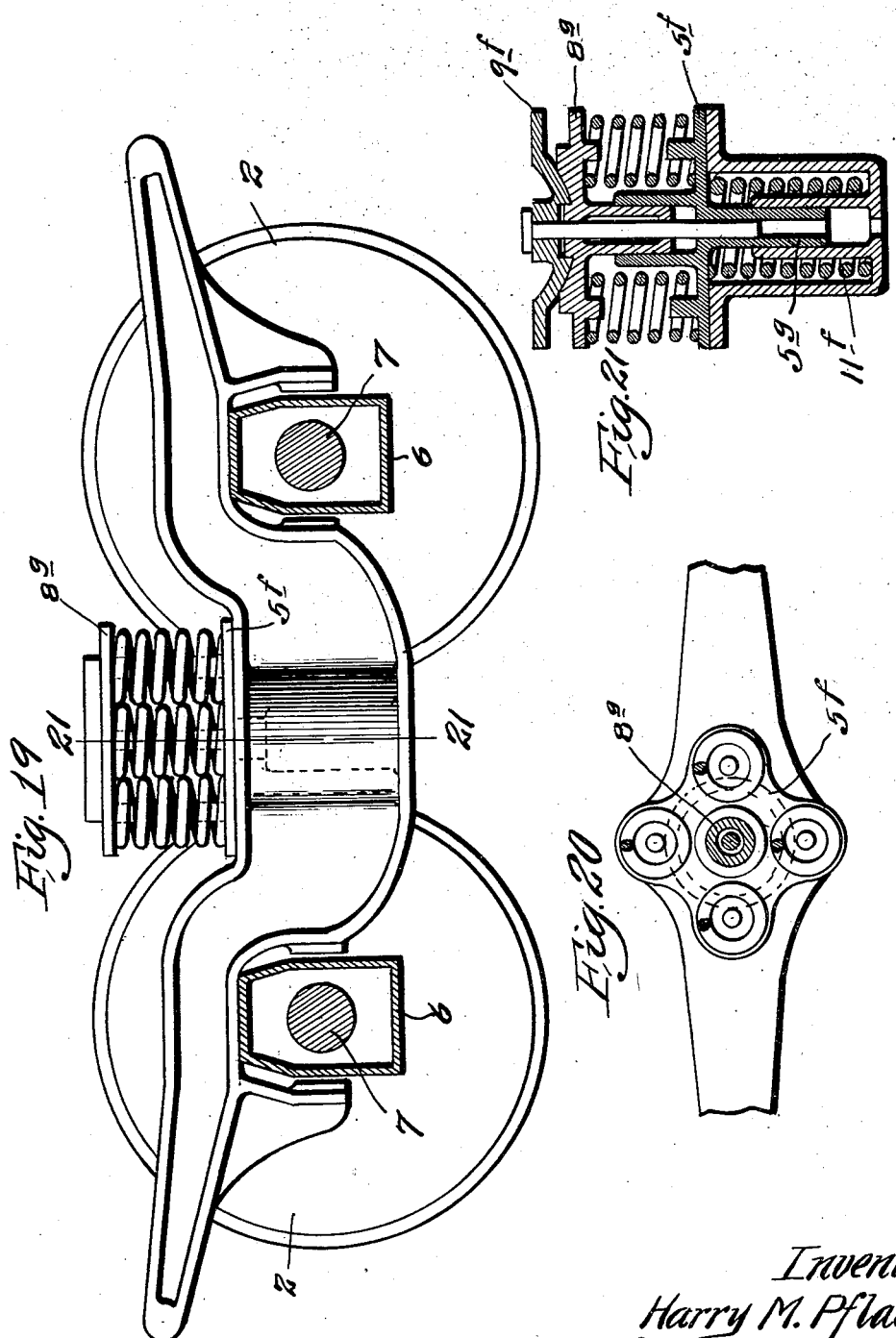

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR CONSTRUCTION.

1,283,553.   Specification of Letters Patent.   Patented Nov. 5, 1918.

Application filed January 12, 1918, Serial No. 211,591. Renewed September 26, 1918. Serial No. 255,857.

*To all whom it may concern:*

Be it known that I, HARRY M. PFLAGER, a citizen of the United States, residing at the city of St. Louis, State of Missouri, have invented a certain new and useful Improvement in Car Construction, of which the following is a full, clear, and exact description, such as will enable others skilled in the art to which it appertains to make and use the same, reference being had to the accompanying drawings, forming part of this specification, in which—

Figure 1 is a conventional illustration in side elevation showing my improved car construction.

Fig. 2 is a top plan view of the same.

Fig. 3 is a top plan view partly in horizontal section of a truck side frame.

Fig. 4 is a side elevational view partly in vertical section of said truck side frame.

Fig. 5 is a horizontal sectional view on line 5—5 of Fig. 4.

Fig. 6 is a vertical sectional view on line 6—6 of Fig. 4.

Fig. 7 is a side elevational view of a truck side frame showing a modified form of my invention.

Fig. 8 is a partial top plan view of the structure shown in Fig. 7.

Fig. 9 is a vertical sectional view on line 9—9 of Fig. 7.

Fig. 10 is a side elevational view of another modified form of my invention.

Fig. 11 is a partial top plan view of the side truck frame.

Fig. 12 is a vertical sectional view on line 12—12 of Fig. 10.

Fig. 13 is a side elevational view of another modified form of my invention.

Fig. 14 is a partial top plan view of the side truck frame.

Fig. 15 is a vertical sectional view on line 15—15 of Fig. 13.

Fig. 16 is a side elevational view of another modified form of my invention.

Fig. 17 is a partial top plan view of the truck side frame.

Fig. 18 is a vertical sectional view on line 18—18 of Fig. 16.

Fig. 19 is a side elevational view of another modified form of my invention.

Fig. 20 is a partial top plan view of the truck side frame.

Fig. 21 is a vertical sectional view on line 21—21 of Fig. 19.

This invention relates to a new and useful improvement in car construction of the type illustrated in Reissue Letters Patent No. 14,221, dated November 28, 1916, the original of which, Patent No. 1,147,430, was granted July 20, 1915.

In the construction shown in said original and reissue Letters Patent granted to me upon the dates beforementioned, the weight of the car body including the load, is supported at the four corners of the car.

My present invention has for its object, to provide means for distributing the load of the car on the journals when unusual track conditions exist.

I prefer to provide this means in the form of a spring or springs, auxiliary to the main carrying springs, the auxiliary springs being capable of greater deflection and greater recoil travel than the main springs, so as not to affect the height of the drawbar from the track.

In the form of my invention illustrated in the accompanying drawings, the compensating springs are weaker than the load-supporting springs, so that when the latter, which may be designated as the "major" springs, are under normal compression, the compensating spring or springs, which may be referred to as the "minor" spring or springs, are under compression, the spring follower of the major springs being seated home against some solid part of the structure, this home seating of said follower being maintained in normal operations. However, if the minor springs are released from compression and have a tendency to float free, the minor spring will have its energies released so as to take up in part the freedom of the major springs, and compress them to the extent that the minor spring assists in supporting the load.

In the drawings, I have heretofore referred to Figs. 1 and 2 as conventionally illustrating a car body in which 1 is the body of the car, 2 the wheels, and 3 the track having a depression 3ª over which the wheels at the righthand side of Fig. 1 are illustrated in full lines as floating over the depression, and in dotted lines as resting upon the track in the depression.

In Fig. 2, 4 indicates the pivotal point of the truck side frames, these being the points of reaction and showing that the car body is practically supported at its four corners.

In Figs. 3 to 6, I have shown my improved truck as comprising the following elements. The truck side frame 5 is preferably made in the form of a steel casting in which there are provided recesses at each end for the reception of the journal boxes 6 in which the axles 7 are mounted. The wheels 2 are arranged on these axles. A truck side frame is provided at its central portion with recesses, the central one of which is designed to receive the compensating spring, while the lateral recesses are designed to receive the guiding members connected to a spring follower 8, said guiding members being slotted to accommodate limiting bolts 9 which pass through the walls of the recesses in the truck side frame. In this manner, the compensating spring 10 arranged within the central recesses can only exert its upward pressure to the extent of movement limited by the bolts 9 and this only in a vertical direction. The spring follower 8 is provided with a spherical concave bearing face on its upper surface which coöperates with convex bearing surface on a spring container 11 bearing in a casting 12 secured between the members of the body transom 13 of the car underframe. The spring container 11 is capable of vertical movement in the casting 12 and contains the springs 14 which normally support the weight of the car, but which, when exhausted, or nearly exhausted, will enable the compensating spring 10 to come into action. The spring container 11 is practically rectangular in shape, the corners of the rectangular being rounded so that said spring container can move vertically, but not rotate in its guiding casting 12. The bearings between the lower portion of the spring container 11 and the spring follower 8 permit the universal rocking movement, to a limited extent, there being a king pin connecting the parts which forms a pivotal connection enabling the truck side frame to swing from the axis thus established. The king pin passes through the openings shown in Fig. 6 in the two bearing surfaces, but is not shown in the drawings. There is a connecting bar 16 in the side castings for purposes well known. The truck side frames are spaced apart by the axles and are held substantially parallel when the car is rounding a curve by virtue of a slight lateral play of the journal boxes 6 between the pedestal jaws of the truck.

In Figs. 7 to 9, I have shown a modified form of truck in which there is a transposition of the supporting springs $14^a$, said springs being located, in this instance, under instead of above the bearing plate members $11^a$, secured to the truck underframe and spring follower $8^a$. The compensating springs $10^a$ are arranged in a recess or housing in the truck side frame $5^a$ and bear upon the underside of the spring follower $8^b$ resting thereon which has telescopic connection with the spring follower $8^a$. The spring follower $8^b$ is provided with depending lugs $8^c$ at each side through which pass bolts $9^a$, the nuts in the lower ends of said bolts being located below the truck side frame so as to limit the vertical movement of the spring follower $8^b$.

In Figs. 10 to 12, I have shown another modified form of my invention in which there are a plurality of recesses in the side frame casting $5^b$ to receive the compensating springs $10^b$. With this exception, this construction is essentially the same as that disclosed in Figs. 7 to 9 inclusive, except for the omission of the limiting bolts which are not here shown, but which of course may be used if desired.

In Figs. 13 to 15, I have shown another modification in which the tie bar $9^d$ connects the side frames of the truck $5^b$ which latter are provided with recesses to receive the guiding members of a bearing plate $8^d$ which coöperates with a spring follower $10^d$ on which are arranged the supporting springs. The compensating springs are located under the bearing plate $8^d$ and act in the manner contemplated.

In Figs. 16 to 18, I have shown another modified form of my invention in which there are three compensating springs arranged in recesses in the truck side frames $5^e$,—the rocking bearing upon plate $8^e$ in the form of a spring follower being guided by a central boss $8^f$,—and this spring follower $8^e$ coöperating with a spring follower-bearing $10^e$ which coöperates with a spring follower $11^e$ secured to the underframe of the car.

In Figs. 19 to 21, I have shown another form of my invention in which the supporting springs are arranged under a follower $8^g$ forming a pivotal rocking bearing in conjunction with a bearing plate $9^f$ secured to the underframe of the car. The lower spring follower $5^f$ is normally seated upon a truck side frame and is provided with a hollow boss $5^g$ having telescopic relation with the hollow boss extending up from the bottom of the recess in the truck side frame in which recess is arranged a compensating spring $11^f$.

In all forms of my invention, the compensating springs are held under compression and when the wheels of the truck pass over or rest in a depressed portion of the track and the supporting springs are partly, or nearly exhausted, then the compensating springs will release their stored-up energies and assist in supporting the corner of the car under which they are located.

It will be readily understood that minor changes in the size, form and construction of the various parts entering into my improved car construction may be made and substituted for those herein shown and described, without departing from the spirit of my invention, the scope of which is set forth in the appended claims.

I claim:

1. In car construction, a truck side frame pivotally arranged with relation to the underframing of the car, said truck side frame being provided with recesses and compensating springs arranged in said recesses and coöperating with a spring follower with which latter coöperate the supporting springs for the car body.

2. In car construction, truck side frames pivotally arranged with relation to the car body and being provided with upwardly opening recesses, compensating springs arranged in said recesses, a spring follower with which said compensating springs coöperate, supporting springs bearing upon said spring follower, and a rocking joint interposed between the truck side frames and the underframing of the car.

In testimony whereof I hereunto affix my signature this 3rd day of January, 1918.

HARRY M. PFLAGER.